J. GIBBONS.

Assignor to the MENEELY HARDWARE COMPANY.

ROLLER BEARING FOR SHAFTS AND AXLES.

No. 10,805. Reissued Feb. 8, 1887.

WITNESSES
Geo. A. Darby
Charles S. Brimtrall

INVENTOR
John Gibbons
by W. C. Nagan his atty

UNITED STATES PATENT OFFICE.

JOHN GIBBONS, OF WEST TROY, NEW YORK, ASSIGNOR TO THE MENEELY HARDWARE COMPANY, OF SAME PLACE.

ROLLER-BEARING FOR SHAFTS AND AXLES.

SPECIFICATION forming part of Reissued Letters Patent No. 10,805, dated February 8, 1887.

Original No. 336,103, dated February 16, 1886. Reissue No. 10,787, dated December 7, 1886. Application for reissue filed January 17, 1887. Serial No. 224,613.

*To all whom it may concern:*

Be it known that I, JOHN GIBBONS, of the village of West Troy, county of Albany, State of New York, have invented new and useful Improvements in Roller-Bearings for Axles or Shafts, of which the following is a specification.

My invention relates to improvements in roller-bearings for axles or shafts, the object and purpose of my invention being to increase their durability, to reduce the amount of friction between the bearings, the shaft or axle, and the box inclosing the roller-bearing by the combination, with the rollers, of friction-balls that are adapted to co-operate with the rollers by the relative construction of the latter, as will hereinafter be described in connection with its illustration.

Accompanying this specification, to form a part of it, there is a plate of drawings containing three figures illustrating my invention, with the same designation of parts by letter-reference used in all of them.

Figure 1:
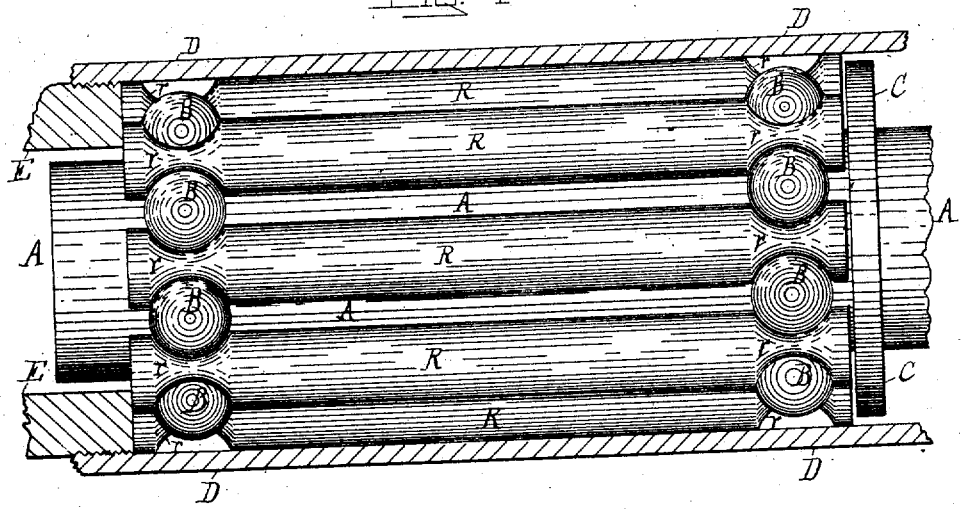
Figure 2:
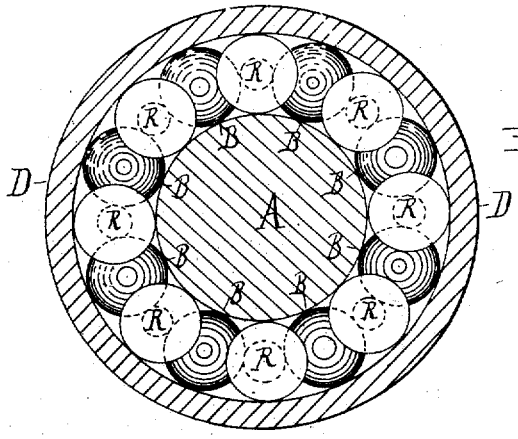
Figure 3:
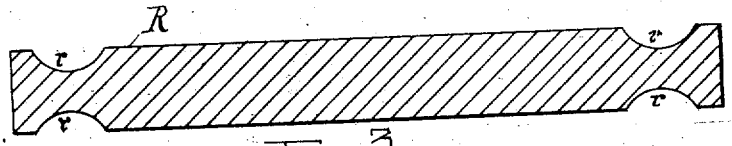

The several parts of the mechanism thus illustrated are designated by letter-reference, and the function of the parts is described as follows:

Of these illustrations, Figure 1 shows a side elevation of my improved roller and ball bearing and the shaft or axle, with the bearing-box and end cap shown in section. Fig. 2 illustrates an end elevation of the combined roller and ball bearing shown at Fig. 1, with the axle and axle or bearing box shown in cross-section. Fig. 3 shows a section of one of the rollers, illustrated as separated from its connection with the other rollers and the balls.

The letters R indicate rollers, of which there is a series arranged around and within the interior of the axle-box, so as to be in contact with the exterior of the shaft or axle and between it and interior surface of the bearing-box. Each of these rollers is rounded out near each end by an annular recess, as designated at *r*, and the letters B indicate balls, of which there is a series, each of said balls being arranged in the coincident recesses of and between two of the rollers.

The letters D designate the bearing-box, A the axle or shaft, and C a collar made thereon, and E a threaded cap. The balls B and the rollers R are of the same diameter. The annular recesses *r* permit the introduction between each two of the rollers of a ball therein, the said recesses being cut to such a depth in the rollers that when a ball is inserted within the recesses it shall be free to turn therein, but so as to leave a space between the rollers. As thus made and arranged, they are placed around the axle or shaft, between the latter and the bearing-box, as indicated at Fig. 1, and the combined rollers and balls may be retained within the box by means of a fixed collar, C, on the axle or shaft, and a cap, L, threaded on the box, having a passage for the axle or shaft, as shown, or by a flange inwardly projected from the box, and by having a collar threaded onto the axle or shaft.

A combined roller and ball bearing thus made reduces the amount of friction and insures a uniformity of wear on the rollers by preventing the twisting of the latter.

Having thus described my invention, what I claim, and desire to secure by Letters Patent, is—

1. In an axle or shaft bearing, the combination, with the box or casing D, of the rollers R, formed with annular recesses *r* near each end, and the balls B, arranged in said annular recesses between said rollers, substantially as described.

2. In an axle or shaft bearing, the combination, with the axle A, provided with a collar, C, and the box or casing D, provided with a threaded end cap, E, of the rollers R, formed with annular recesses *r* near each end, and the balls B, arranged in said recesses between the rollers, substantially as described.

3. In an axle or shaft bearing, the combination, with the box or casing D, of the rollers R, formed with annular recesses *r* near each end, and the balls B, having the same diameter as the rollers and arranged between said rollers within the annular recesses, substantially as described, and for the purposes set forth.

4. In an axle or shaft bearing, the combiation, with the box or casing D, of the rollers R, formed with the annular recesses *r*, the balls B, having the same diameter as the rollers and arranged within the said annular recesses, as shown, a collar on the axle or shaft, and a threaded cap in the box, substantially as and for the purposes set forth.

Signed at Troy, New York, this 30th day of December, 1886, in the presence of the two witnesses whose names are hereto written.

JOHN GIBBONS.

Witnesses:

GEO. A. DARBY,

CHARLES S. BRINTNALL.